June 3, 1969     HO CHOW     3,447,357
METHOD OF MANUFACTURING A LINK MEMBER WITH A SPHERICAL BEARING
Filed Sept. 28, 1965

INVENTOR.
HO CHOW
BY
Davis, Hoxie, Faithfull & Hapgood
ATTORNEYS.

United States Patent Office 3,447,357
Patented June 3, 1969

3,447,357
METHOD OF MANUFACTURING A LINK MEMBER WITH A SPHERICAL BEARING
Ho Chow, River Edge, N.J., assignor to The Heim Universal Corporation, Fairfield, Conn., a corporation of Connecticut
Filed Sept. 28, 1965, Ser. No. 490,923
Int. Cl. B21d *43/28, 22/00;* B21k *27/06*
U.S. Cl. 72—324                                                5 Claims

ABSTRACT OF THE DISCLOSURE

A sheet metal member for a linkage joint characterized by a bowl-shaped portion with a hole therein is formed under the urging of mating bowl-shaped die elements. The male die includes a pilot portion substantially larger in diameter than a coresponding hole initially present in the sheet metal member.

---

The present invention relates to a link member of a linkage joint with a spherical bearing and to a method of producing such a link member.

One type of such linkage comprises a sheet metal link member having a bowl-shaped portion with a hole through the bottom of the bowl, an inner member rotatable within the bowl-shaped portion and attached to another link by a shaft extending through the hole in the bottom of the bowl, and a ring-like retainer outside the bowl-shaped portion, the retainer having a flat top surface bearing against the link attached to the inner member, the retainer also having a concave surface partially surrounding the bowl-shaped portion. The present invention is concerned with the structure of the sheet metal link member and a method of manufacturing the sheet metal link member's bowl-shaped portion and of forming the wall of the hole through the bottom of the bowl.

The standard practice in forming of sheet metal around a hole is first to punch the hole, which results in a sharp, ragged corner, and then to use a pilot, or guide, for the forming punch, the pilot being slightly smaller than the hole. If standard practice is followed it is necessary to remove the sharp, ragged corner of the hole by machining, which is a relatively expensive operation. Moreover, even with machining some roughness still remains. It is undesirable to have either a sharp corner or roughness at the hole in the bowl-shaped portion of the sheet metal member, for it rubs the inner member, resulting in excess wear or causing weakness of the shaft of the inner member.

It is an objective of the present invention to provide a sheet metal member which has neither a sharp corner nor roughness at the part of the hole adjacent to the inner member. It is a further objective to provide a method of making such a member that is simple and inexpensive.

In accordance with the present invention, a hole is punched in a piece of sheet metal in the usual manner. The piece of metal is then placed so that the hole is over a die. The die has a bowl-shaped indentation with a further circular cavity at the bottom of the indentation. The die is positioned beneath the platen of a power press. A punch, attached to the press platen, is specially shaped, in accordance with the present invention, to form the sheet metal member into the bowl shape of the die and to provide a smooth interior surface to the hole in the sheet metal member. The punch has a bowl-shaped portion which performs the shaping of the sheet metal member, and a pilot portion whose diameter is greater than the diameter of the hole in the sheet metal member.

According to my invention the oversized pilot causes cold flow of metal away from the offending part of the sheet metal member, that is, the corner where it rubs against the inner member, leaving a smooth bevel instead of a ragged corner.

The action of the oversized pilot according to the present invention will be apparent from the following detailed description and the accompanying drawings, in which.

Figure 1:
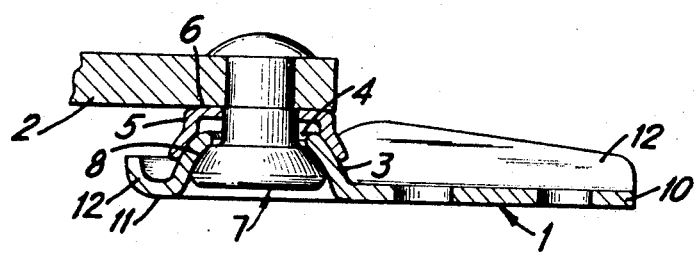
FIG. 1 is a side cut-away view of the linkage in which the sheet metal member produced by the present invention is used.
Figure 2:
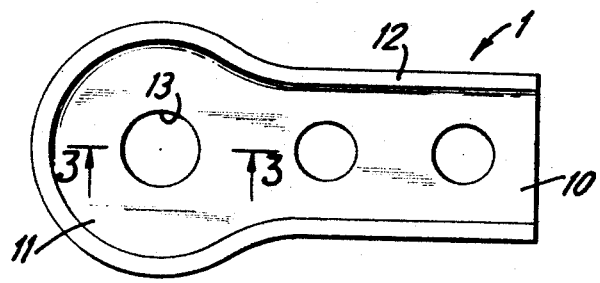
FIG. 2 is a top view of the sheet metal member prior to the forming of the bowl-shaped portion.

As shown in FIG. 1 the linkage consists of a sheet metal link member 1 and a second link member 2. The link member 1 has an integral bowl-shaped portion 3 with a hole 4 at the bottom of the portion 3. The bowl-shaped portion 3 has interior and exterior segmental spherical bearing surfaces. A ring-like retainer 5 having an interior bearing surface is in bearing contact with the exterior surface of the bowl-shaped portion 3. The ring-like retainer 5 has a flat annular exterior top bearing surface 6. A stud member 7, attached to arm 2, has a lower bearing portion 8 which is in contact with the interior of the bowl-shaped portion 3. The stud member has an upper shank portion which extends with a substantial clearance through the hole 4 of the bowl-shaped portion 3 and also extends through the hole in the ring-like retainer 5. The link member 2 has a bottom surface in bearing contact with the top exterior bearing surface of the retainer 5.

The sheet metal member 1 prior to its forming, in the process of this invention, consists of a strip portion 10 and an integral enlarged circular portion 11. The sheet metal member may be made of any metal which is ductile enough to undergo the forming operations set forth below. It has been found that good results can be obtained by the use of cold-rolled strip steel, A.I.S.I. Number 1010, Number 4 Temper. An upraised edge flange 12 is provided around the outer edge of member 1 for additional strength. This flange may be formed prior to or at the same time of the method described hereinafter.

Figure 3:
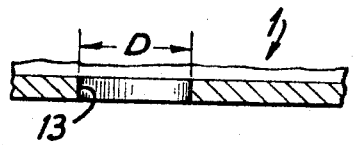
FIG. 3 is a section view taken along lines 3—3 of FIG. 2.
Figure 4:
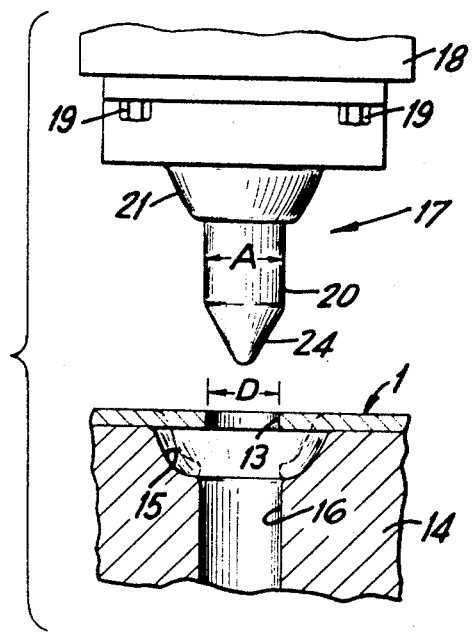
FIG. 4 is a side cut-away view and shows the apparatus used in the method of the present invention.

A hole 13 is punched in the circular portion 11 of the sheet metal member. As shown in FIG. 3, a section view of the sheet metal member prior to its formation in the process of this invention, the hole 13 has a precisely determined dimension D. The sheet metal member 1 is then placed on a lower die 14, as shown in FIG. 4. Lower die 14 has a bowl-shaped cavity 15 at the bottom of which is an opening 16. Lower die 14 is positioned beneath a forming press (not shown), which has an upper forming die 17 attached to the press platen 18 by means of bolts 19.

The upper forming die 17 consists of a lower pilot portion 20 and an intermediate owl-shaped forming punch 21. The pilot portion 20 is a rod-like member with a reduced end 24 which is rounded and has a blunt point. The bowl portion 21 is the same shape and size as desired for the inner surface of the bowl portion 3 of the sheet metal member 1.

The dimension A of the body of the pilot portion 20 is such that it is substantially greater than that of the dimension D of the hole 13. The hole 13 is of a suitable shape such as circular or elliptical. Good results can be achieved if A is more than twenty percent greater than D, with best results occurring when A is about fifty percent greater than D. The use of an oversized pilot is contrary to the usual shop practice in which the shape of the pilot is slightly smaller than the hole through which it protrudes. The reason for the pilot's being smaller in the usual practice is that the principal purpose of the pilot in the usual practice is to insure that the sheet to be worked on is centered in proper place in relation to the upper die and this purpose can be achieved by undersized pilot. A great benefit is derived from the use of the oversized pilot, as will hereinafter appear. The opening 16 of the lower die 14 is made slightly larger than the pilot portion 20 of the upper forming die 17. The body of the pilot portion 20 is of the same shape, in cross-section, as the hole 13. After the sheet metal member is positioned on the lower die 14, the upper die is lowered. This brings the pilot portion 20 of the upper die down through the hole 13 and causes the bowl portion of the upper die to form the bowl-shaped portion of the sheet metal member (see broken lines in FIG. 4).

Figure 5:
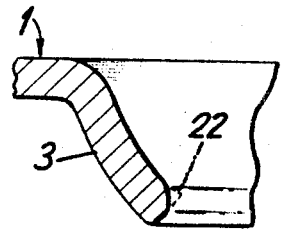
FIG. 5 is an enlarged cut-away sectional view of one portion of the sheet metal member after the bowl-shaped portion is formed.

The effect of the oversized pilot 20 is shown in FIG. 5. The broken lines at 22 show what was a sharp corner before the oversized pilot 20 passed through the hole 13. According to my invention the conical portion 24 of the pilot has hit the corner 22 of the hole and the metal at the corner 22 has been moved by cold flow action of the oversized pilot 20 so that this metal has flowed downward leaving a smooth bevel without raggedness at the edge of the hole where the sheet metal member rubs the inner member. The final shape of the hole 4 is always slightly larger than the pilot portion 20.

When the pilot is raised the sheet metal member 1 is normally removed from the pilot by a stripper of any conventional type for ejection. The dimensions of the pilot are such that whereas it causes downward cold flow of the metal at the top of the hole, as stated above, it is not so large as to allow a slight clearance with the final shape of the hole 4 of the bowl shaped portion 3.

I claim:

1. The process of producing a sheet metal member for a linkage joint with a bowl-shaped portion with a hole, including the steps of forming a hole in the sheet metal member, having an upper edge, placing the sheet metal member over a lower forming die having therein a bowl-shaped spherical cavity and an opening at the bottom of the cavity, positioning the sheet metal member so that its hole is over the bowl-shaped cavity and beneath a press having attached to it an upper forming die, the said upper forming die including a pilot section whose size is substantially greater than the size of the hole in the said sheet metal member, the pilot section having a tapered end portion with a terminal segment smaller than said hole, the upper forming die also including a bowl-shaped portion having an exterior spherical surface, centering said sheet metal member relative to said upper and lower forming dies by lowering said terminal segment of said pilot section through said hole, deforming the metal about the upper periphery of said hole in said sheet metal member to form two intersecting surfaces, said deforming step comprising forcing the composite pilot section of said upper die through said hole, and forming said sheet metal member into bowl-shaped form such that said intersecting surfaces about said hole are substantially parallel to, and slope outward from the axis of said hole, said bowl-shaping step comprising urging said bowl-shaped portion of said outer and lower dies together.

2. The process claimed in claim 1, in which the hole in the sheet metal and the reduced end portion as well as the pilot section are round in their cross-sections.

3. The process claimed in claim 1, in which the hole in the sheet metal and the reduced end portion, as well as the pilot section, are elliptical in their cross-sections.

4. The process claimed in claim 1, in which the size of the pilot section is about fifty percent greater than the size of the hole in the sheet metal member.

5. The process claimed in claim 1, in which the size of the pilot section is at least twenty percent greater than the size of the hole in the sheet metal member.

References Cited

UNITED STATES PATENTS

| | | | |
|---|---|---|---|
| 1,921,525 | 8/1933 | Howard et al. | 29—159.3 |
| 2,157,354 | 5/1939 | Sherman | 72—379 |
| 2,418,736 | 4/1947 | Styes | 72—358 |
| 2,423,957 | 7/1947 | Amtsberg | 72—358 |
| 2,932,338 | 4/1960 | Franck | 72—356 |
| 3,123,910 | 3/1964 | Neilson | 72—356 |

CHARLES W. LANHAM, *Primary Examiner.*

E. M. COMBS, *Assistant Examiner.*

U.S. Cl. X.R.

72—352, 356, 358, 377, 379, 412